(12) United States Patent
Hamada

(10) Patent No.: US 8,884,227 B2
(45) Date of Patent: Nov. 11, 2014

(54) SENSOR

(71) Applicant: Seiko Epson Corporation, Tokyo (JP)

(72) Inventor: Yasuaki Hamada, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/173,174

(22) Filed: Feb. 5, 2014

(65) Prior Publication Data

US 2014/0264028 A1  Sep. 18, 2014

(30) Foreign Application Priority Data

Mar. 15, 2013  (JP) ................................. 2013-053231

(51) Int. Cl.
*H01L 37/00* (2006.01)
*G01J 5/34* (2006.01)

(52) U.S. Cl.
CPC ........................................ *G01J 5/34* (2013.01)
USPC ...................................................... 250/338.2

(58) Field of Classification Search
USPC ...................... 250/338.1, 338.2, 338.3, 338.4
See application file for complete search history.

(56) References Cited

U.S. PATENT DOCUMENTS 5,949,071 A      9/1999  Ruffner et al.
2012/0161002 A1*  6/2012  Yoshizaki ................ 250/338.3

FOREIGN PATENT DOCUMENTS

JP        06-265411       9/1994
JP        2003-530538 A   10/2003

* cited by examiner

*Primary Examiner* — Mark R Gaworecki
(74) *Attorney, Agent, or Firm* — Harness, Dickey & Pierce, P.L.C.

(57) ABSTRACT

A sensor includes a first electrode, a second electrode, a ferroelectric element that is disposed between the first electrode and the second electrode and that has a ferroelectric film formed of a ferroelectric substance, and a detector configured to read an electric charge generated in the ferroelectric element. The detector performs reading by applying a first voltage for aligning polarization directions of the ferroelectric film and a second voltage for reversing polarization of at least part of the ferroelectric film whose polarization directions have been aligned.

5 Claims, 6 Drawing Sheets

SENSOR

BACKGROUND

1. Technical Field

The present invention relates to a sensor.

2. Related Art

Infrared sensors or terahertz sensors are broadly classified, in terms of the detection principle, into quantum types and thermal types. Of these types of sensors, thermal-type sensors need not be cooled in order to prevent noise. For this reason, thermal-type sensors have attracted much attention. For example, the usage of infrared sensors of the pyroelectric type, which is one of the thermal types, as human sensors and so forth has become widespread, and such sensors can acquire information on the presence of a human body and the temperature of the human body in a noncontact fashion by detecting infrared rays having a wavelength of about 10 µm that are radiated from the human body. Such a pyroelectric-type infrared sensor includes a thermoelectric transducer (hereinafter sometimes referred to as a pyroelectric element).

A pyroelectric element has the property of absorbing thermal energy of infrared rays to cause a temperature change and inducing electric charges in accordance with the temperature change. Lead zirconate titanate (hereinafter abbreviated as PZT) expressed by a composition formula of $Pb(Zr, Ti)O_3$, for example, with which a relatively large pyroelectric coefficient is obtained is known as a material of a pyroelectric element.

However, in order to improve sensitivity, responsivity, and so forth, the size of one pixel of a pyroelectric material in an infrared sensor has recently been made very small. This makes it difficult to produce a sensor from a bulk material. To address this issue, a pyroelectric sensor using spin-coated PZT as a pyroelectric material has been proposed (see JP-T-2003-530538).

Unfortunately, when PZT in the form of a thin film as described in JP-T-2003-530538 is used, a problem arises in that it is difficult to achieve good infrared sensor sensitivity.

SUMMARY

An advantage of some aspects of the invention is that it provides a sensor that can improve the sensitivity of an infrared sensor even when a material in the form of a thin film is used.

According to an aspect of the invention, a sensor includes a first electrode, a second electrode, a ferroelectric element that is disposed between the first electrode and the second electrode and that has a ferroelectric film formed of a ferroelectric substance, and a detector configured to read an electric charge generated in the ferroelectric element. The detector performs reading by applying a first voltage for aligning polarization directions of the ferroelectric film and a second voltage for reversing polarization of at least part of the ferroelectric film whose polarization directions have been aligned. According to such an aspect, reading is performed by applying the first voltage for aligning polarization directions of the ferroelectric film and the second voltage for reversing polarization of at least part of the ferroelectric film. Thereby, temperature can be detected using the amount of reversed polarization based on a variation in the coercive voltage caused by a change of the temperature. The sensor sensitivity can thus be improved.

Here, it is preferable that the second voltage be 0.5 times or more and 1.5 times or less a coercive voltage of the ferroelectric film. Thereby, part of the state in which the directions of polarization have been aligned can be reversed. Temperature can be detected with improved reproducibility by the amount of reversed polarization based on a variation in the coercive voltage caused by a change of the temperature.

Additionally, it is preferable that the first voltage be 5 times or more a coercive voltage of the ferroelectric film. Thereby, the directions of polarization of the ferroelectric film can be aligned. Temperature can be detected with improved reproducibility by the amount of reversed polarization based on a variation in the coercive voltage caused by a change of the temperature.

Additionally, it is preferable that lead zirconate titanate (PZT) or strontium bismuth tantalate niobate (SBTN) be used as the ferroelectric film. Thereby, temperature can be detected with more reliability by the amount of reversed polarization based on a variation in the coercive voltage caused by a change of the temperature. The sensor sensitivity can thus be improved.

Additionally, it is preferable that a complex oxide that is free of lead and has a perovskite structure containing bismuth, iron, barium, and titanium be used as the ferroelectric film. Thereby, a sensor free of lead is realized. Temperature may be detected with more reliability by the amount of reversed polarization based on a variation in the coercive voltage caused by a change of the temperature. The sensor sensitivity can thus be improved.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
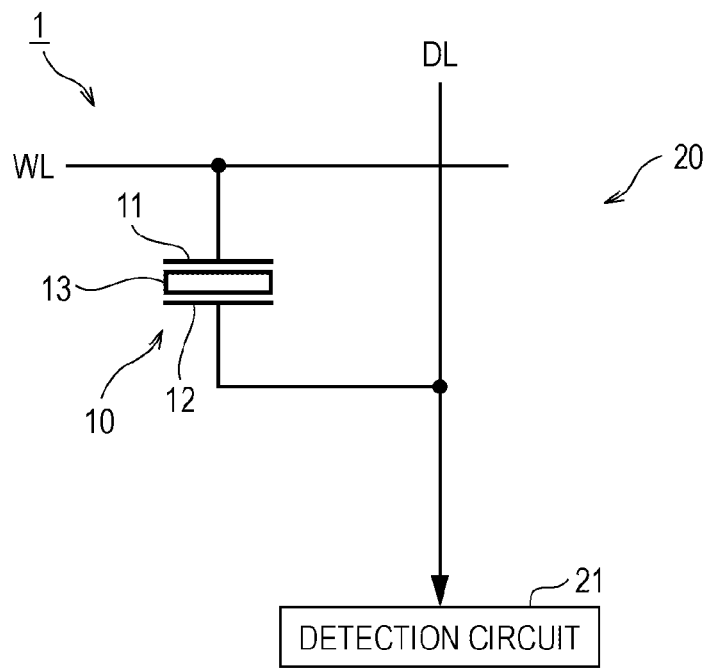
FIG. 1 is a diagram showing a schematic configuration of an infrared sensor according to an embodiment of the invention.

An embodiment of the invention will be described in detail below with reference to FIG. 1 to FIG. 5. Such an embodiment, which indicates one aspect of the invention, does not limit the invention and may be arbitrarily changed within the scope of the invention. It is to be noted that, among constituent members shown in FIG. 1 to FIG. 5, the same members are denoted by the same reference numerals, and the description thereof is suitably omitted.

FIG. 1 is a diagram showing a schematic configuration of an infrared sensor, which is an example of a sensor according to the embodiment of the invention. As shown in the drawing, an infrared sensor 1 includes a ferroelectric element 10 and a detector 20. The ferroelectric element 10 includes a first electrode 11, a second electrode 12, and a ferroelectric film 13 provided therebetween. The detector 20 includes a row line WL connected to the first electrode 11, a column line DL connected to the second electrode 12, and a detection circuit 21 connected to the column line DL.

The infrared sensor 1 of the invention is similar in configuration to a related-art pyroelectric sensor; however, the infrared sensor 1 is a new sensor that completely differs from the related-art pyroelectric sensor in the detection principle and the detector.

The related-art pyroelectric sensor measures a change in temperature by detecting the amount of change in the amount of polarization of a pyroelectric film (a ferroelectric film) with temperature. In contrast, paying attention to the fact that a coercive voltage Vc of the ferroelectric film 13 varies with temperature, the infrared sensor 1 of the invention performs reading by applying a first voltage for aligning polarization directions of the ferroelectric film 13 and a second voltage for reversing the polarization of at least part of the ferroelectric film 13 whose polarization directions have been aligned, and thus, since the coercive voltage Vc varies with temperature, a change ($\Delta p$) in the amount of polarization reversed by application of the second voltage is detected as a change in temperature.

Figure 2:
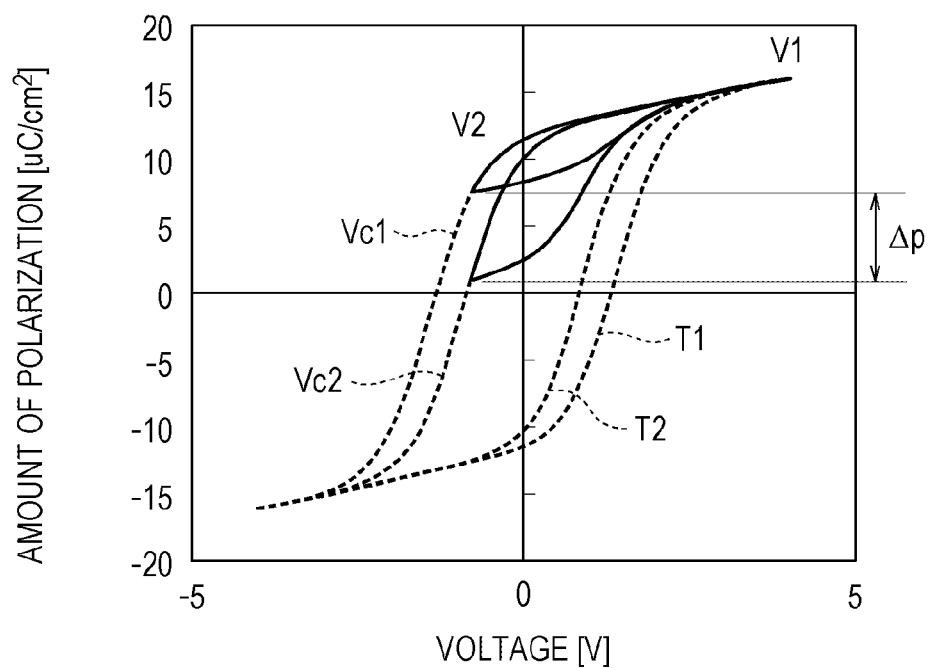
FIG. 2 is a graph for explaining the reading principle of the infrared sensor.

This principle is shown in FIG. 2. As shown in FIG. 2, the ferroelectric film 13 has the characteristics of a hysteresis curve. When a first voltage V1 is applied, the polarization of the ferroelectric film 13 is saturated in one direction on the hysteresis curve. Subsequently, when a second voltage V2 is applied, part of the polarization is reversed on the hysteresis curve. The case of a temperature T1 and the case of a temperature T2, which is a temperature higher than T1, are shown for this situation. A coercive voltage Vc2 in the case of the temperature T2 is closer to a voltage of zero compared with a coercive voltage Vc1 in the case of the temperature T1, and thereby reversal of polarization at the temperature T2 is larger compared with that at the temperature T1. Accordingly, when the amount of polarization at the second voltage V2 relative to the amount of polarization at the first voltage V1 is read as a difference in the electric charge amount, a change in temperature can be detected. Regarding the amount of change with temperature in the amount of polarization at this point, it has been verified that the amount of change in the case where PZT is used as the ferroelectric film 13 is 180 times that in the case of a related-art pyroelectric sensor, which will be described later.

In this way, the infrared sensor 1 of the invention is markedly improved in terms of sensitivity, compared with a related-art pyroelectric sensor, by changing the detection principle.

Here, the first voltage V1, which is to be applied by the detector 20 of the invention, may be always applied during standby, and may also be applied immediately before the second voltage V2 is applied. Although the magnitude and the application period of time of the first voltage V1 are not limited as long as they can align the polarization directions of the ferroelectric film 13, the first voltage V1 is 5 times or more the coercive voltage Vc, and the application period of time, which is dependent on the entire capacitance of the detector 20 and therefore is not unconditionally specified, may be on the order of nanoseconds if the capacitance is sufficiently small. Also, the second voltage V2 may be, for example, a voltage of about 0.5 to 1.5 times the coercive voltage of the ferroelectric film 13, and the application period of time, which is dependent on the entire capacitance of the detector 20 and therefore is not unconditionally specified, may be on the order of nanoseconds to microseconds if the capacitance is sufficiently small. Additionally, even if this application period of time is relatively long, on the order of milliseconds to seconds, no problem is presented since the reversal of polarization is a stable phenomenon.

Figure 3A:
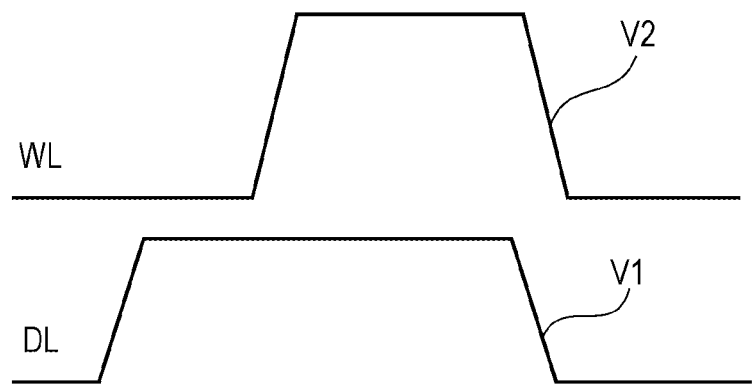
FIG. 3A and FIG. 3B are charts showing examples of voltage application according to the embodiment of the invention.
Figure 3B:
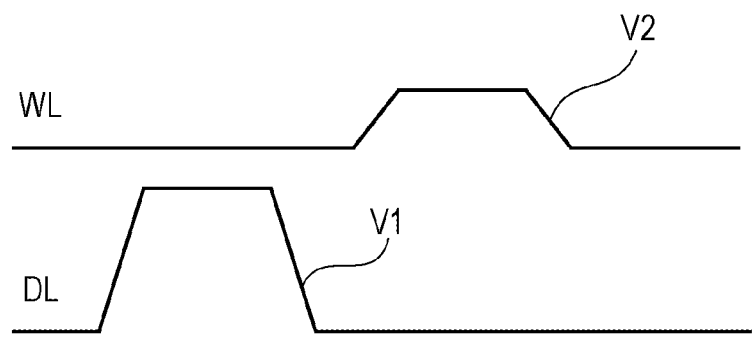

FIG. 3A and FIG. 3B show examples of timing charts of application of the first voltage V1 and the second voltage V2. FIG. 3A shows an example where the first voltage V1 is applied in the form of pulses to the column line DL, and the second voltage V2 is applied in the form of pulses to the row line WL in such a manner as to be superimposed on the first voltage V1 before the application of the first voltage V1 is completed. FIG. 3B shows an example where the first voltage V1 is applied in the form of pulses to the column line DL, and thereafter the second voltage V2 is applied in the form of pulses to the row line WL.

Note that while FIG. 3A and FIG. 3B show that the first voltage V1 is applied through the column line DL to the second electrode 12, and the second voltage V2 is applied through the row line WL to the first electrode 11, a combination of the first voltage V1 and the second voltage V2 in the form of pulses may instead be applied to either the first electrode 11 or the second electrode 12.

Materials having conductivity may be used for the first electrode 11 and the second electrode 12, and, in particular, Pt, Ti, Cr, Al, Au, Cu, and so forth may be used. The first electrode 11 and the second electrode 12 made of such materials are layered or film-like. Note that these forms, materials, thicknesses, and so forth may be changed without departing from the spirit and scope of the invention.

Here, in the embodiment of the invention, the ferroelectric film 13 provided between the first electrode and the second electrode 12 is not limited if the ferroelectric film 13 is made of a ferroelectric material. For example, lead zirconate titanate (PZT) or strontium bismuth tantalate niobate (SBTN), which is used for a pyroelectric sensor of the related art, may be used. In addition, a lead-free ferroelectric substance, for example, a complex oxide having a perovskite structure containing bismuth, iron, barium, and titanium may be used.

The ferroelectric film 13 as mentioned above can be formed using, for example, a metal-organic decomposition (MOD) method in which a solution of an organometallic compound dissolved or dispersed in a solvent is applied and dried, and further is baked at high temperature, thereby obtaining a pyroelectric material made of a metallic oxide. Note that a method for manufacturing a pyroelectric film is not limited to the MOD method; for example, a sol-gel method, a laser ablation method, a sputtering method, a pulsed laser deposition method (PLD method), a CVD method, an aerosol deposition method, and so forth may be used.

Figure 4A:
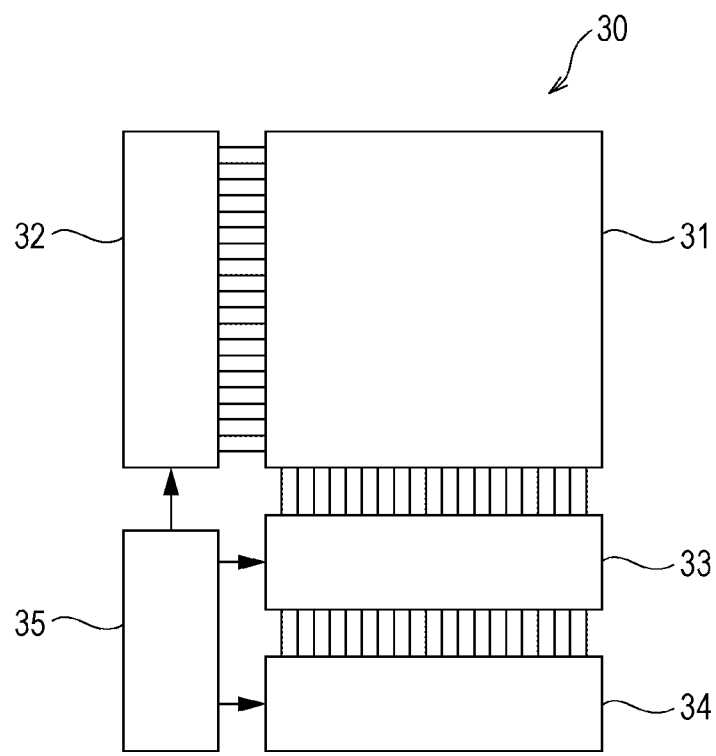
FIG. 4A and FIG. 4B show an example of a configuration of a sensor device according to the embodiment of the invention.
Figure 4B:
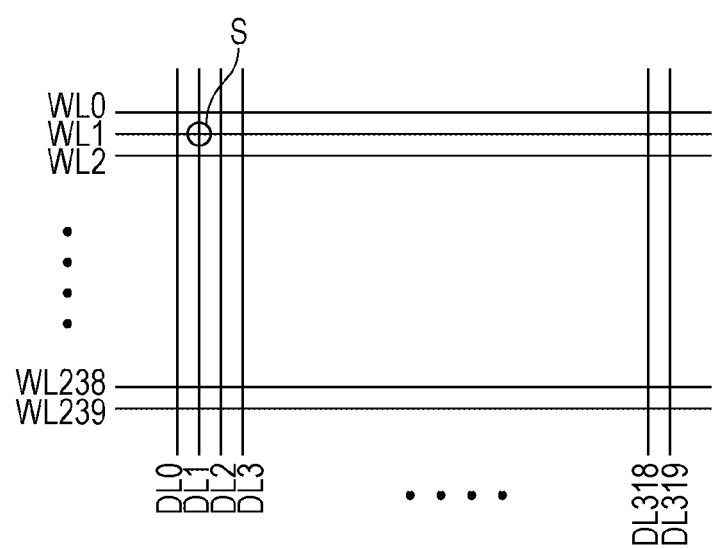

Next, a sensor device using the ferroelectric element 10 will be described with reference to FIG. 4A and FIG. 4B. FIG. 4A and FIG. 4B show an example of a configuration of a sensor device 30. Note that the sensor device is not limited to the configuration of FIG. 4A and FIG. 4B, and various modifications such as removal of some of the elements, replacement thereof with other elements, and addition of other elements may be made.

As shown in FIG. 4A and FIG. 4B, the sensor device 30 includes a sensor array 31, a row-selection circuit (row driver) 32, and a reading circuit 33. Also, the sensor device 30 may include an analog-to-digital (A/D) conversion unit 34 and a control circuit 35. An infrared camera and so forth used for a night-vision device and so forth can be implemented using the sensor device 30.

A plurality of sensor cells are arranged (disposed) in the sensor array 31. A plurality of row lines (word lines, scanning lines) WL and a plurality of column lines (data lines) DL are also provided. The number of column lines DL may be one. For example, when the number of row lines WL is one, a plurality of sensor cells are arranged in the direction (horizontal direction) along the row line in FIG. 4A. In contrast, when the number of column lines DL is one, a plurality of sensor cells are arranged in the direction (vertical direction) along the column line DL.

Each sensor cell of the sensor array 31 is disposed (formed) at a location corresponding to the intersecting position of each row line and each column line. A sensor cell S of FIG. 4B, for example, is disposed at a location corresponding to the intersecting position of a row line WL 1 and a column line DL 1. Other sensor cells are disposed similarly. Although not shown in FIG. 4A and FIG. 4B, the ferroelectric element described above is provided in the sensor cell S.

The row selection circuit 32 connects to one or a plurality of row lines. Then, an operation of selecting each row line is performed. By way of example, in the case of the sensor array 31, which is a quarter video graphics array (QVGA) of 320× 240 pixels, for example, as shown in FIG. 4B, operations of sequentially selecting (scanning) row lines WL0, WL1, WL2, . . . , WL239 are performed. In other words, signals for selecting these row lines (word selection signals) are output to the sensor array 31.

The reading circuit 33 connects to a plurality of column lines. Then, an operation of selecting each column line is performed. By way of example, in the case of the sensor array 31, which is a QVGA of 320×240 pixels, operations of reading detection signals from column lines DL0, DL1, DL2, . . . , DL319 are performed. Although not shown in the drawing, for example, the reading circuit 33 is provided with amplifier circuits that correspond to respective ones of the plurality of column lines. Each amplifier circuit amplifies signals of the corresponding column line.

The A/D conversion unit 34 performs A/D conversion to convert a detection voltage acquired in the reading circuit 33 to digital data. Then, digital data DOUT obtained after the A/D conversion is output. In particular, the A/D conversion unit 34 is provided with A/D converters that correspond to respective ones of the plurality of column lines. Each A/D converter performs A/D conversion of a detection voltage acquired in the corresponding column line by the reading circuit 33. Note that one A/D converter may be provided so as to correspond to the plurality of column lines, and, using the one A/D converter, A/D conversion of detection voltages of the plurality of column lines may be performed in a time-sharing fashion. Additionally, instead of providing the reading circuit 33 with the amplifier circuits, signals of each column line may be directly input to each A/D converter of the A/D conversion unit 34.

The control circuit 35 generates various kinds of control signals, and outputs them to the line selection circuit 32, the reading circuit 33, and the A/D conversion unit 34. For example, signals for controlling timings of the circuits and other signals are generated and output.

The sensor device using the ferroelectric element 10 described above enables a change in the temperature of each of the ferroelectric elements 10 arranged in the sensor array 31 to be measured. An infrared camera and so forth used for, for example, a night-vision device and so forth can therefore be implemented.

Figure 5:
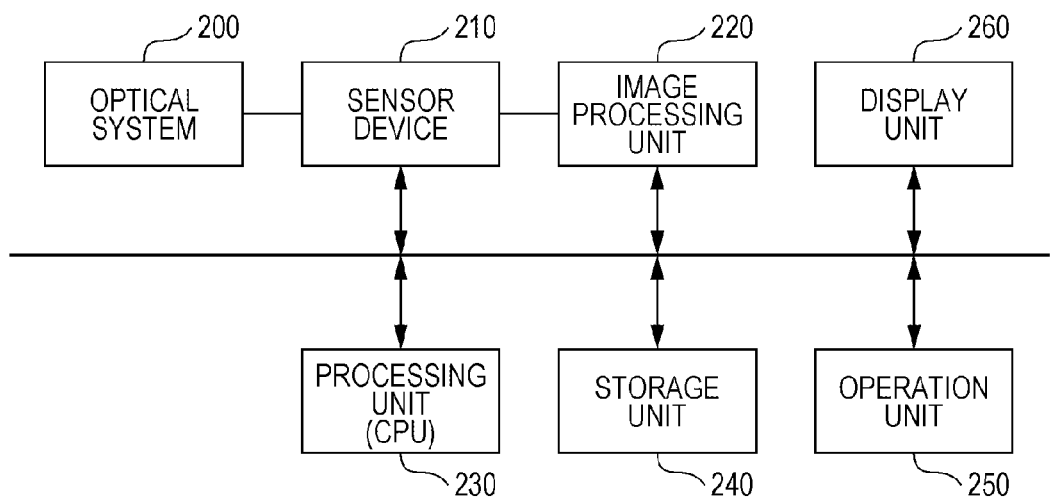
FIG. 5 shows an example of a configuration of an electronic apparatus including the sensor device.

FIG. 5 shows an example of a configuration of an electronic apparatus including the sensor device of this embodiment. This electronic apparatus is, for example, an infrared camera including an optical system 200, a sensor device 210, an image processing unit 220, a processing unit 230, a storage unit 240, an operation unit 250, and a display unit 260. Note that the electronic apparatus of this embodiment is not limited to the configuration of FIG. 5, and various modifications such as removal of some (for example, the optical system, the operation unit, the display unit, and so forth) of the elements, replacement thereof with other elements, and addition of other elements may be implemented.

The optical system 200 includes, for example, one or a plurality of lenses, a driving unit that drives these lenses, and so forth. The optical system 200 forms an image of an object on the sensor device 210. The optical system 200 performs focus adjustment and so forth if needed.

The sensor device 210, which is the sensor device described with reference to FIG. 4A, FIG. 4B, and so forth, captures an image of an object. The image processing unit 220 performs various kinds of image processing, such as image correction processing, on the basis of digital image data (pixel data) from the sensor device 210.

The processing unit 230 controls the entire electronic apparatus, and controls each block in the electronic apparatus. The processing unit 230 is implemented, for example, by a central processing unit (CPU) or the like. The storage unit 240 stores various kinds of information, and functions as a work region of the processing unit 230 or the image processing unit 220. The operation unit 250 serves as an interface for a user to operate the electronic apparatus, and is implemented, for example, by various buttons, a graphical user interface (GUI) screen, and so forth. The display unit 260 displays an image acquired by the sensor device 210, a GUI screen, and so forth, and is implemented by a liquid crystal display, an organic electroluminescent display, or another one of various displays, or a projection-type display device.

Note that this embodiment is applicable to an infrared camera using a focal plane array (FPA) and an electronic apparatus using the infrared camera. Conceivable examples of an electronic apparatus to which an infrared camera is applied include a night vision apparatus that captures an object image at night, a thermography apparatus that acquires temperature distribution of an object, an invasion detection apparatus that detects an invader, an analysis apparatus (measurement apparatus) that analyzes (measures) physical information of an object, a security apparatus that detects a fire and heat generation, and a factory automation (FA) apparatus provided in a factory and so forth. If a night vision apparatus is applied to onboard equipment, the figure of a person at night can be detected and displayed while a vehicle is running. Additionally, if an infrared camera is applied to a thermography apparatus, the thermography apparatus can be used for flu quarantine and so forth.

Note that although this embodiment has been described in detail as described above, it could be readily understood by a person skilled in the art that many modifications that do not substantially depart from the novel features and effects of the invention may be made. Accordingly, such modifications all fall within the scope of the invention. For example, a term described together with a different term with a broader meaning or the same meaning at least once in the specification or drawings may be replaced with the different term in any portion of the specification or drawings. Additionally, the configuration and operations of the detector, the sensor device, and the electronic apparatus are not limited to those described in this embodiment, and various modifications thereof may be made.

EXAMPLES

Examples will be described below. However, the invention is not limited by the examples given blow.

Example 1

Figure 6:
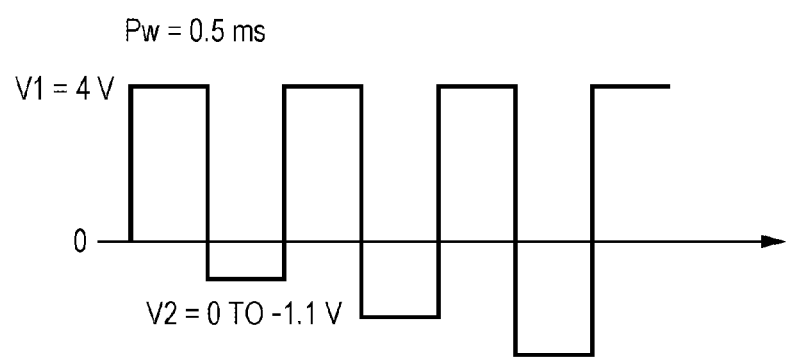
FIG. 6 shows pulses used for reading in example 1.

The read amount of polarization of a ferroelectric element using a $SrBi_2Ta_{1.6}Nb_{0.4}O_9$ (hereinafter abbreviated as SBTN) thin film having a thickness of 110 nm was measured in the form of pulses shown in FIG. 6. Three temperature levels of 26° C., 29° C., and 32° C. were used for measurement. Note that the negative coercive voltage of the ferroelectric film used in this measurement was about −0.55 V.

Figure 7:
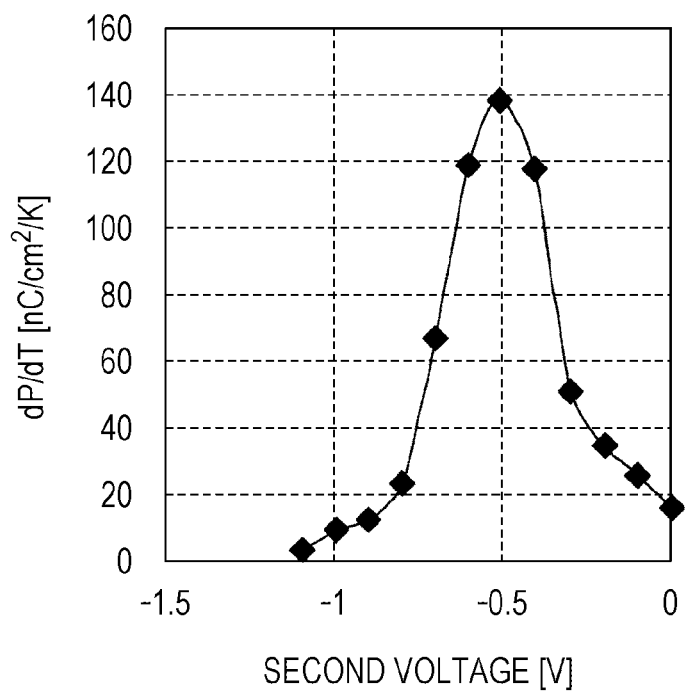
FIG. 7 shows detection results of example 1.

The results are shown in FIG. 7. The measurement result obtained when V2=0 V, which is close to a manner in which the related-art technique is used, was that $dP/dT=15$ $nC/cm^2/K$, whereas, when V2=−0.5 V, a significant change in temperature was obtained such that $dP/dT=138$ $nC/cm^2/K$.

Example 2

Figure 8:
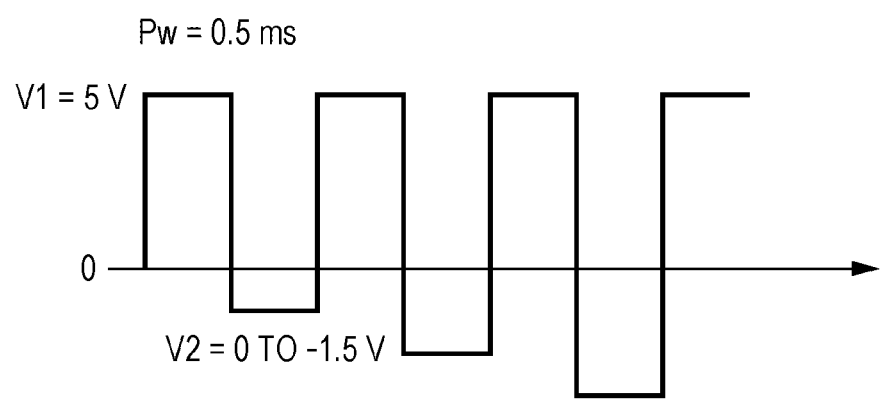
FIG. 8 shows pulses used for reading in example 2.

The read amount of polarization of a ferroelectric element using a $PbZr_{0.4}Ti_{0.6}O_3$ (hereinafter abbreviated as PZT) film having a thickness of 150 nm was measured in the form of pulses shown in FIG. 8. Three temperature levels of 26° C., 29° C., and 32° C. were used for measurement. Note that the negative coercive voltage of the ferroelectric film used in this measurement was about −0.80 V.

Figure 9:
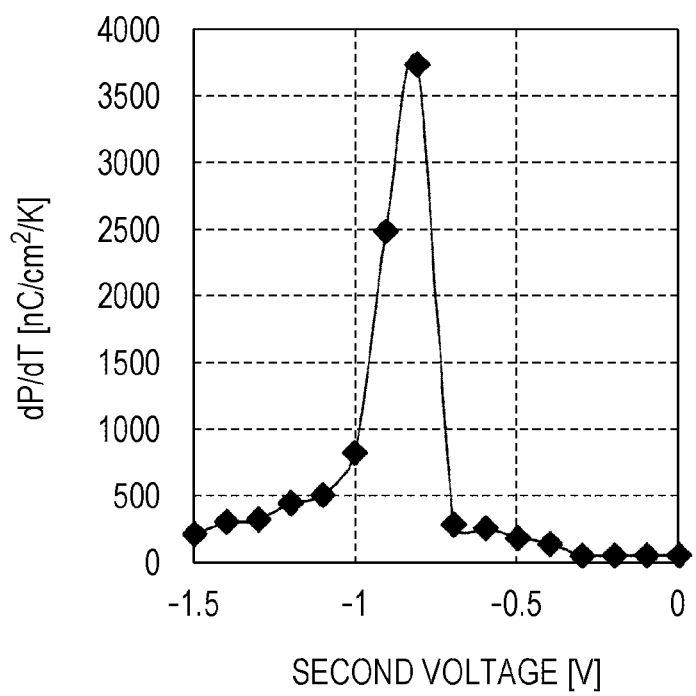
FIG. 9 shows detection results of example 2.

The results are shown in FIG. 9. The measurement result obtained when V2=0 V, which is close to the manner in which the related-art technique is used, was that $dP/dT=23$ $nC/cm^2/K$, whereas, when V2=−0.8 V, it was verified that an extremely significant change in temperature was obtained such that $dP/dT=3747$ $nC/cm^2/K$.

It is concluded that, as mentioned in examples, in the sensor of the invention, the temperature coefficient of the read amount of polarization of a ferroelectric element can be extremely increased. This may provide a larger signal-to-noise (S/N) ratio of a ferroelectric element, which may lead to an increase in the performance, a reduction in the size, and so forth of the ferroelectric element.

The invention may be used for various applications that use pyroelectric elements of the related art, such as a temperature sensor, an infrared sensor, and other various optical sensors.

The entire disclosure of Japanese Patent Application No. 2013-053231, filed Mar. 15, 2013 is incorporated by reference herein.

What is claimed is:

1. A sensor comprising:
   a first electrode;
   a second electrode;
   a ferroelectric element disposed between the first electrode and the second electrode, the ferroelectric element having a ferroelectric film formed of a ferroelectric substance; and
   a detector configured to read an electric charge generated in the ferroelectric element,
   wherein the detector performs reading by applying a first voltage for aligning polarization directions of the ferroelectric film and a second voltage for reversing polarization of at least part of the ferroelectric film whose polarization directions have been aligned.

2. The sensor according to claim 1, wherein the second voltage is in a range of 0.5 to 1.5 times a coercive voltage of the ferroelectric film, inclusive.

3. The sensor according to claim 1, wherein the first voltage is 5 times or more a coercive voltage of the ferroelectric film.

4. The sensor according to claim 1, wherein lead zirconate titanate (PZT) or strontium bismuth tantalate niobate (SBTN) is used as the ferroelectric film.

5. The sensor according to claim 1, wherein a complex oxide that is free of lead and has a perovskite structure containing bismuth, iron, barium, and titanium is used as the ferroelectric film.

\* \* \* \* \*